(12) United States Patent
Katsumata et al.

(10) Patent No.: US 8,939,866 B2
(45) Date of Patent: Jan. 27, 2015

(54) TOROIDAL TRACTION DRIVE

(75) Inventors: Shin Katsumata, Rockford, IL (US);
Johannes Wilhelm Picard, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 267 days.

(21) Appl. No.: 13/421,037

(22) Filed: Mar. 15, 2012

(65) Prior Publication Data

US 2013/0244827 A1 Sep. 19, 2013

(51) Int. Cl.
*F16H 15/38* (2006.01)

(52) U.S. Cl.
USPC ............. 476/10; 476/2; 476/3; 476/4; 476/11

(58) Field of Classification Search
CPC ...... F16H 15/38; B64C 25/405; Y02T 50/823
USPC ................ 476/40, 42, 1, 2, 3, 4, 9, 10, 11
See application file for complete search history.

(56) References Cited

U.S. PATENT DOCUMENTS

| | | | |
|---|---|---|---|
| 3,933,054 A | 1/1976 | Iseman | |
| 6,174,254 B1 | 1/2001 | Tsai | |
| 6,179,739 B1 | 1/2001 | Tsai et al. | |
| 6,224,509 B1 * | 5/2001 | Gierling | 477/45 |
| 6,290,620 B1 | 9/2001 | Tsai et al. | |
| 6,553,330 B2 | 4/2003 | Ikeda et al. | |
| 6,705,964 B2 * | 3/2004 | Nagai et al. | 475/216 |
| 6,740,001 B1 * | 5/2004 | Ishikawa et al. | 476/42 |
| 6,743,149 B2 * | 6/2004 | Sagara et al. | 476/42 |
| 6,752,735 B2 * | 6/2004 | Ishikawa et al. | 475/216 |
| 6,892,161 B2 | 5/2005 | Ikeda et al. | |
| 6,951,524 B2 * | 10/2005 | Ishikawa et al. | 476/8 |
| 7,204,777 B2 * | 4/2007 | Miller et al. | 475/189 |
| 7,217,220 B2 | 5/2007 | Careau et al. | |
| 7,503,869 B2 * | 3/2009 | Nishizawa et al. | 476/2 |
| 7,520,832 B2 * | 4/2009 | Toyoda et al. | 475/209 |
| 7,632,208 B2 | 12/2009 | Greenwood et al. | |
| 7,909,727 B2 * | 3/2011 | Smithson et al. | 476/36 |
| 8,057,354 B2 | 11/2011 | Frank et al. | |
| 8,171,636 B2 * | 5/2012 | Smithson et al. | 29/893.3 |
| 8,313,404 B2 * | 11/2012 | Carter et al. | 475/192 |

FOREIGN PATENT DOCUMENTS

JP 2006057649 3/2006

* cited by examiner

*Primary Examiner* — David M Fenstermacher

(74) *Attorney, Agent, or Firm* — Carlson, Gaskey & Olds, P.C.

(57) ABSTRACT

A toroidal traction drive has an axial loading system with a primary loading component and a non-linear cam roller loading component.

20 Claims, 5 Drawing Sheets

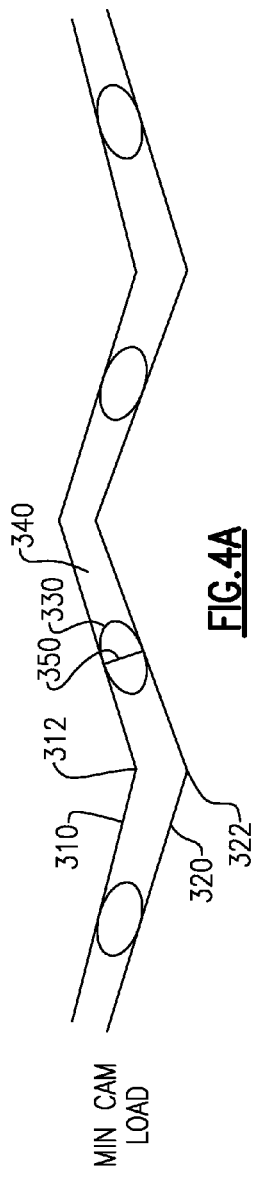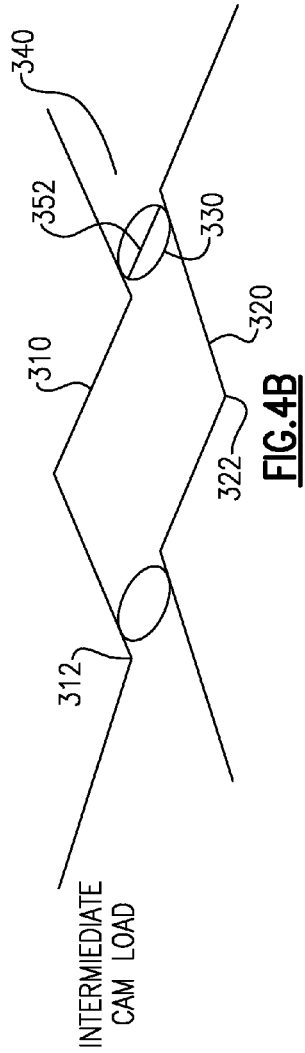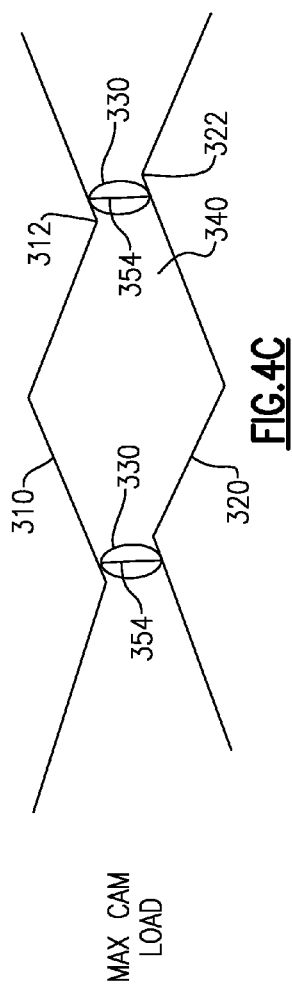

MIN CAM LOAD

INTERMEDIATE CAM LOAD

MAX CAM LOAD

TOROIDAL TRACTION DRIVE

TECHNICAL FIELD

The present disclosure relates generally to toroidal traction drives and more particularly to axial loading mechanisms for toroidal traction drives.

BACKGROUND OF THE INVENTION

Toroidal Continuous Variable Transmissions ("CVT") are used to transmit rotational power from multiple sources, such as jet engines, to an electric generator. Toroidal traction drives use power rollers and toroids to translate rotational motion from the power rollers to a shaft by using the traction between the power rollers and the toroids. In order to generate sufficient traction between the toroids and the power rollers, an axial clamping force is applied to the toroids along an axis defined by the shaft thereby pressing the toroids against the power roller and allowing the power roller to transmit rotational power to the shaft. The input speeds from the multiple power sources generally vary within a certain speed range.

As the load on the shaft changes, the amount of axial clamping force required to maintain adequate traction between the power rollers and the toroids, and thereby ensure full power transmission to the shaft also changes. In some systems, the amount of clamping force required to maintain the traction can be predicted, and the clamping force can be gradually increased or decreased to compensate. In other systems, such as electrical generator systems, the load can change suddenly and unpredictably, requiring a fast response to maintain traction.

In one example, an axially loaded toroidal drive system uses a spring with a constant stiffness to provide a necessary axial loading force. In another example, an axial loaded toroidal drive system uses linear cam rollers to provide an adjustable axial load. Another example of an axial loading toroidal drive system uses a combination of a linear cam and a fixed spring to provide the axial load.

SUMMARY OF THE INVENTION

Disclosed is a toroidal traction drive having an axial loading system, where the axial loading system has a primary loading component and a non-linear cam roller loading component.

Also disclosed is an integrated drive generator for an aircraft. The integrated drive generator includes a toroidal traction drive generator operable to receive rotational power from at least one source; a shaft operable to output rotational power from the toroidal traction drive to an electrical generator. The toroidal traction drive comprises an axial loading system, where the axial loading system has a primary loading component and a non-linear cam roller loading component.

These and other features of the present invention can be best understood from the following specification and drawings, the following of which is a brief description.

BRIEF DESCRIPTION OF THE DRAWINGS

FIG. 4A schematically illustrates a first non-linear cam in a minimum cam load position.

FIG. 4B schematically illustrates the first non-linear cam in an intermediate load position.

FIG. 4C schematically illustrates the first non-linear cam in a maximum load position.

DETAILED DESCRIPTION

Figure 1:
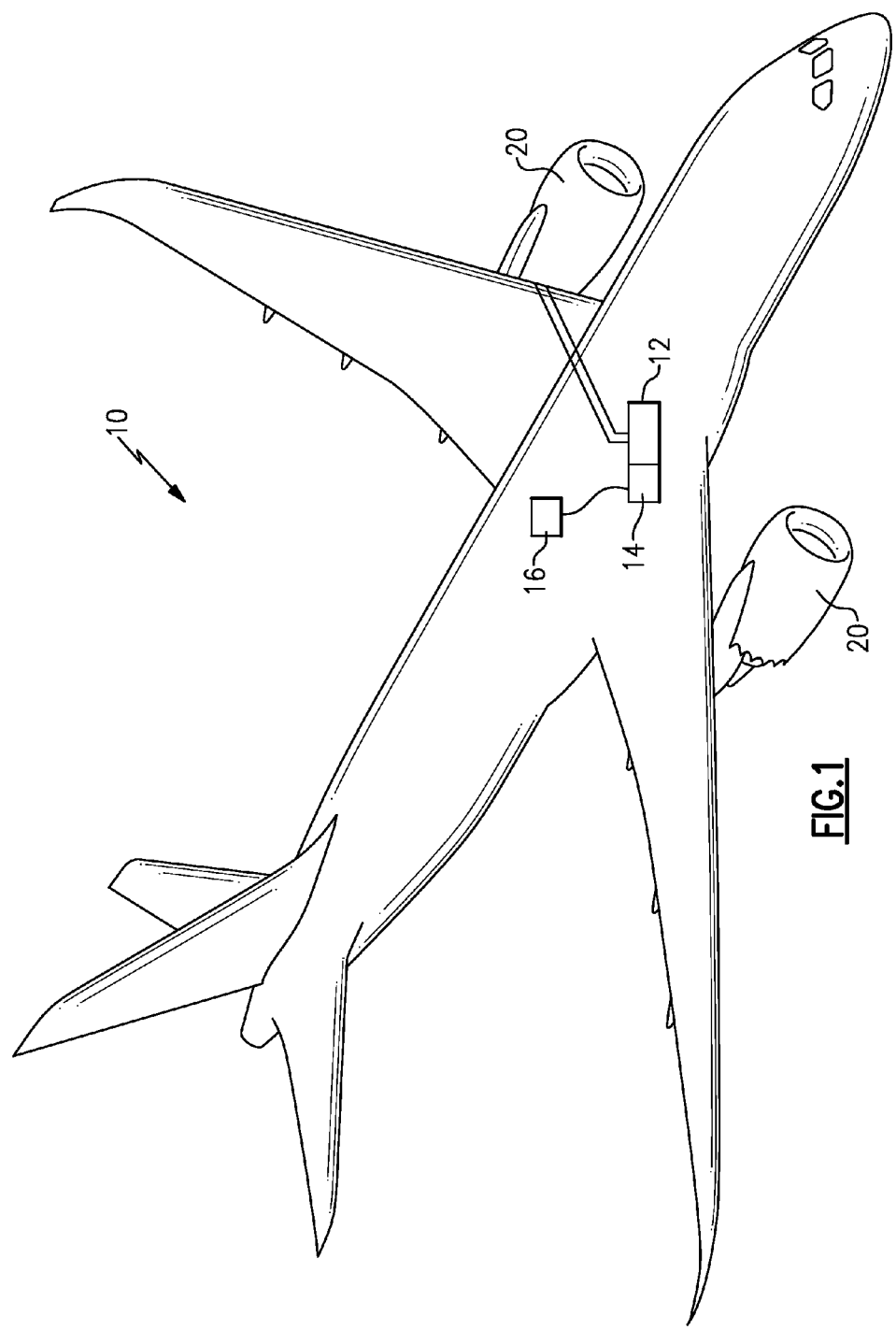
FIG. 1 schematically illustrates an aircraft integrated drive generator system.

FIG. 1 schematically illustrates an aircraft 10 having multiple turbine engines 20. In the example shown, each turbine engine 20 is mechanically connected to two toroidal traction drives that are substantially similar such as, for example, toroidal traction drive 12. The toroidal traction drive 12 converts rotation of the turbine engines 20 to rotation of a single shaft within the toroidal traction drive 12. The shaft further translates its rotation to a generator 14 that generates electrical power, using known generator techniques, for supply to onboard electrical systems 16.

Figure 2:
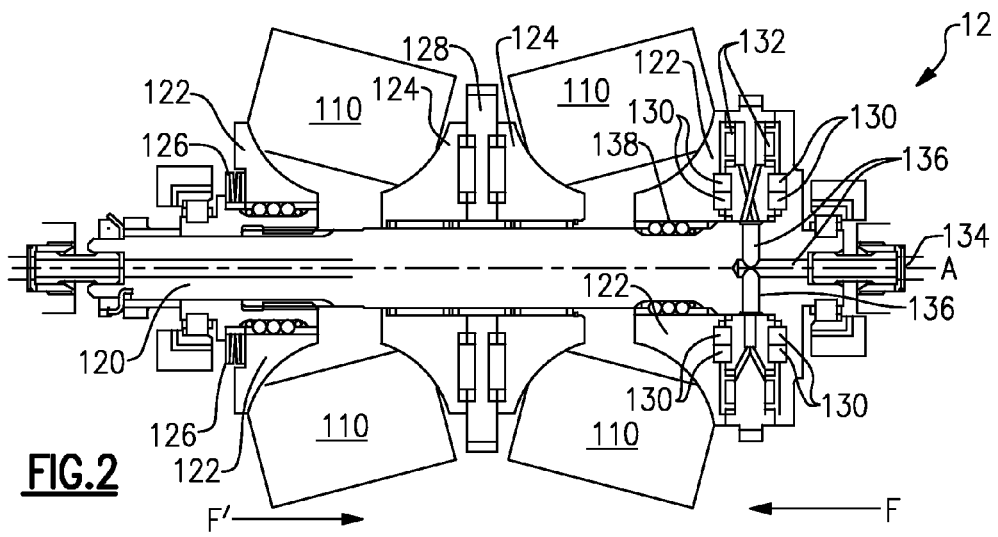
FIG. 2 schematically illustrates an example toroidal continuously variable transmission.

FIG. 2 schematically illustrates the toroidal traction drive 12 of FIG. 1 in greater detail. The toroidal traction drive 12 includes a center shaft 120 and two pairs of power rollers 110. Each of the power rollers 110 contacts an input toroid 122 and an output toroid 124. Each of the toroids 122, 124 exerts an axial force F or F' on the corresponding power roller 110 to prevent the roller 110 from slipping and to ensure full translation of rotation from the power roller to the output toroid 124, and thus to a gear. The force F is exerted along an axis A defined by the shaft 120, and is referred to as axially loading the toroidal traction drive 12. The input toroids 122 are slidably mounted on the shaft 120 using axial ball bearings 138.

In order to ensure a correct axial load is applied, and thereby prevent slipping of the power rollers 110 regardless of the load on the shaft 120, a hydraulic axial loading system and a roller cam axial loading system are incorporated in at least one of the input toroids 122, and apply the axial load to the input and output toroids 122, 124. A constant spring 126 on a second end of the shaft 120 applies a counter-force F' to the input and output toroids 122, 124. The counter-force F' is dependent on the particular spring 126 utilized and the axial loading force F, and can be determined by one skilled in the art in light of the present disclosure.

The input toroid 122 on the end of the shaft 120 axially opposite the spring 126 includes multiple cam rollers 130 (the roller cam loading system) and multiple hydraulic pistons 132 (the hydraulic loading system) that are capable of controlling the axial load on the input and output toroids 122, 124. A hydraulic input port 134 provides hydraulic fluid through hydraulic passages 136 to the hydraulic pistons 132, thereby allowing for control of the hydraulic pistons 132 by an outside controller. The hydraulic pistons 132 increase or decrease an axially aligned roller gap 340, 440 (illustrated in FIGS. 4A-4C and 5A-5C respectively) in the cam rollers 130 and thereby increase or decrease the axial loading, and control the traction between the power rollers 110 and the input and output toroids 122, 124. Similarly, the cam rollers 130 can rotate to increase or decrease the axial load provided by the cam rollers 130 by increasing the roller gap 340, 440 according to known cam roller principles.

Figure 3:
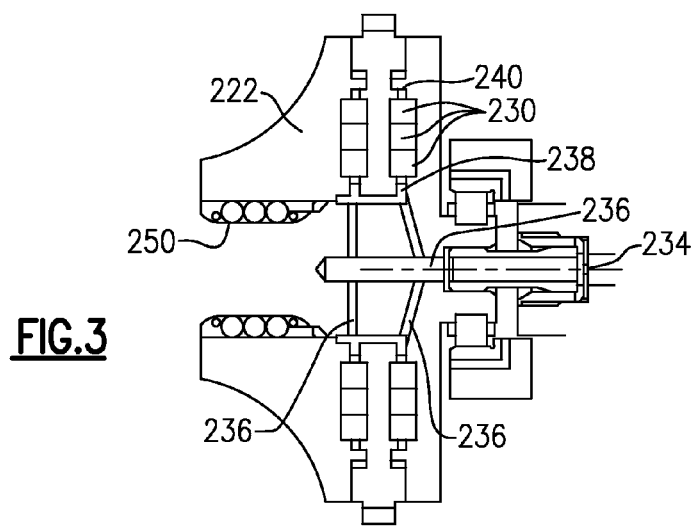
FIG. 3 illustrates an alternate input toroid for a toroidal continuously variable transmission.

FIG. 3 illustrates an alternate input toroid 222 including an alternate axial loading system similar to the system illustrated in FIG. 2. In the example illustrated in FIG. 3, the hydraulic pistons 132 of FIG. 2 are omitted and the cam rollers 230 are sealed using an inner diameter seal 238 and an outer diameter seal 240. Hydraulic fluid is pumped into or out of the roller gap 340, 440 within the sealed cam rollers 230, through a fluid input 234 on hydraulic passage 236, thereby directly altering the roller gap 340, 440. Increasing the roller gap 340, 440 increases the axial loading and decreasing the roller gap 340, 440 decreases the axial loading. As with the example of FIG. 2, the input toroid 222 in the example of FIG. 3 is mounted to the shaft via axial ball bearings 250

Figure 2A:
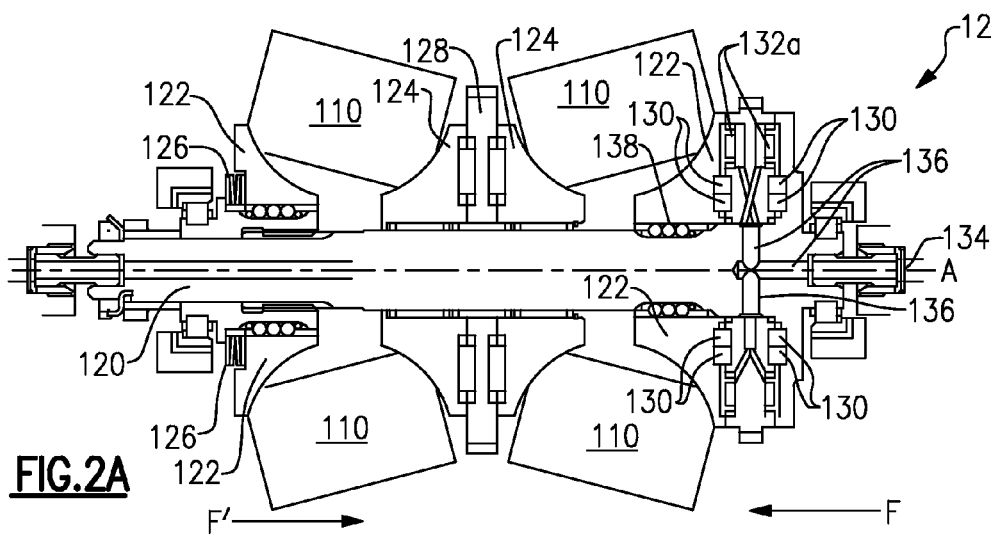
FIG. 2a illustrates an alternative example toroidal continually variable transmission.

In alternate embodiments, non-hydraulic pistons such as piezo-electric pistons can be utilized in place of the hydraulic pistons 132 to affect the roller gap in the cam rollers 130, 230. FIG. 2a illustrates the example system using a piezo-electric piston 132a in place of the hydraulic piston 132 shown in FIG. 2.

FIGS. 4A-4C partially schematically illustrate a cam roller 130, 230, using linear cam roller disks 310, 320 and a non-linear (ovoid) bearing 330 to create a non-linear cam roller 130, 230. The non-linear nature of the illustrated cam roller 130, 230 causes the force required to rotate the cam roller 130, 230 to increase in an non-linear fashion as the cam roller 130 is rotated, thereby causing the rotational force on the cam roller 130, 230 required to achieve a set axial load to increase in a non-linear fashion. FIG. 4A illustrates the cam roller 130, 230, in a minimum cam load position. The ovoid cam follower 330 contacts the top roller disk 310 and the bottom roller disk 320 at the lowest diameter 350 of the ovoid cam follower 330, and the cam roller gap 340 is minimized. In the minimum axial load position, the rotational force required to increase the axial load is also minimized.

FIG. 4B illustrates the cam roller 130, 230 in an intermediate axial cam load position. Relative to the minimum axial cam load position (FIG. 4A), the top cam roller disk 310 and the bottom cam roller disk 320 are rotated in opposite directions (counter-rotated). In an alternate example, only a single disk, either the first cam roller disk 310 or the second roller disk 320, is rotated and the other cam roller disk 310, 320, is held stationary. The rotation of the roller disks 310, 320 causes the non-linear bearing 330 to rotate to a position where an intermediate diameter 352 is contacting each roller disk 310, 320. As the diameter of the roller bearing 330 contacting the roller disks 310, 320 increases, the rotational force required to further rotate the cam roller 130, 230 increases. Similarly, as the cam follower approaches the peaks 312, 322 in the roller disks 310, 320, the roller gap 340 is increased, thereby increasing the axial load on the input toroid.

FIG. 4C illustrates the cam roller 130, 230 in a maximum cam load position. The top cam roller disk 310 and the bottom cam roller disk 320 have been further counter-rotated, and the largest diameter 354 of the cam roller bearing 330 is contacting each roller disk wall 310, 320. In the maximum load position, the cam roller 130, 230 cannot rotate or increase the axial load, and all increased axial loading must be provided by the hydraulic loading system.

Figure 5A:
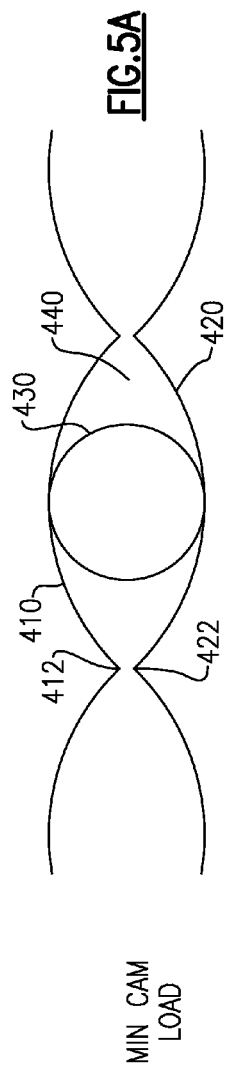
FIG. 5A schematically illustrates a second non-linear cam in a minimum cam load position.
Figure 5B:
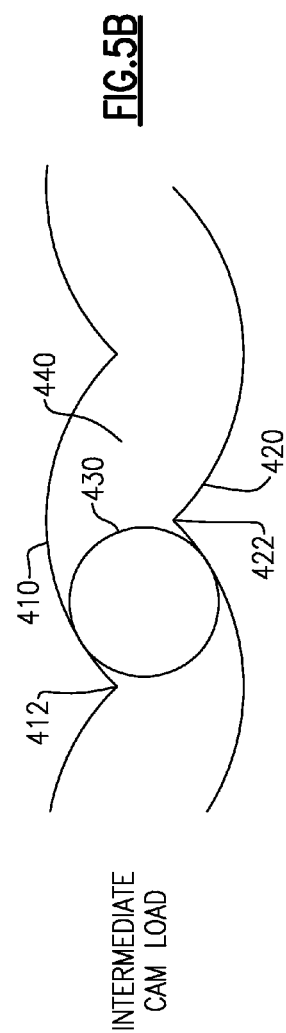
FIG. 5B schematically illustrates the second non-linear cam in an intermediate load position.
Figure 5C:
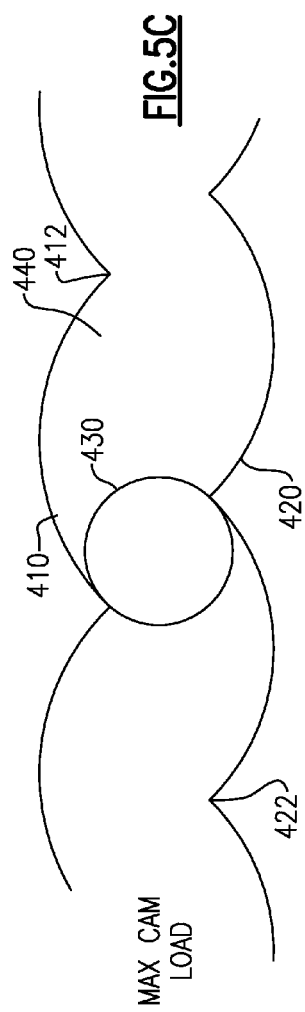
FIG. 5C schematically illustrates the second non-linear cam in a maximum load position.

FIGS. 5A-5C illustrate another example non-linear cam roller bearing that can be used in the example toroidal traction drives 12 of FIGS. 1-3. The example cam roller 130, 230 of FIGS. 5A-5C uses a spherical cam follower 430, and non-linear cam roller disks 410, 420. As with the example of FIGS. 4A-4C, counter-rotation of the top cam roller disk 410 and the bottom cam roller disk 420 causes the cam follower 430 to roll relative to the cam roller disks 410, 420, and thereby increase the cam roller gap 440 and the axial loading provided by the cam. The curved shape of the roller disks 410, 420 in the example of FIG. 5 serves a similar function to the ovoid cam follower shape in the example illustrated in FIG. 4, and causes the force required to rotate the roller disks 410, 420 to increase as the bearing approaches the peaks 412, 422 of the roller disks 410, 420.

By combining non-linear cam rollers 130, 230 with a hydraulic loading system, the non-linear cam roller 130, 230 reacts to load changes immediately, thereby providing a fast reaction time. However, due to the non-linear nature of the cam roller 130, 230, the cam roller 130, 230 only reacts alone until the force required to further rotate the cam roller 130, 230 is equalized with the hydraulic loading, at which point both axial loading systems (the cam roller 130, 230 and the hydraulic loading) begin working together. Thus, the toroidal drive can achieve the reaction time benefit of a cam roller system, the resilience benefit of a hydraulic loading system, and both systems can work with repeated, unanticipated load changes.

Figure 6A:
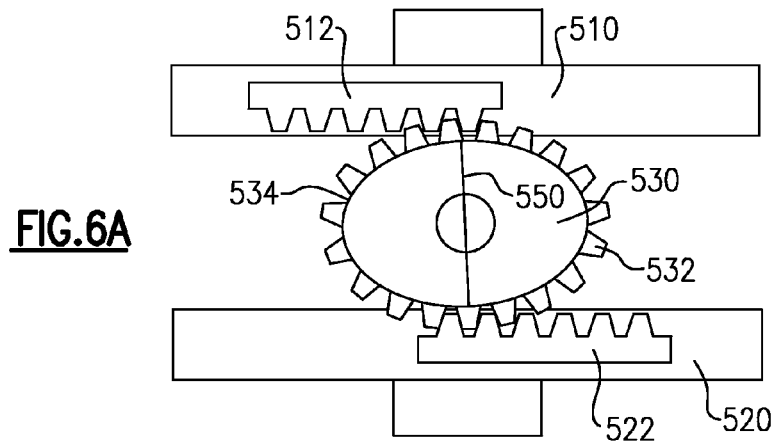
FIG. 6A schematically illustrates a third non-linear cam in a minimum cam load position.
Figure 6B:
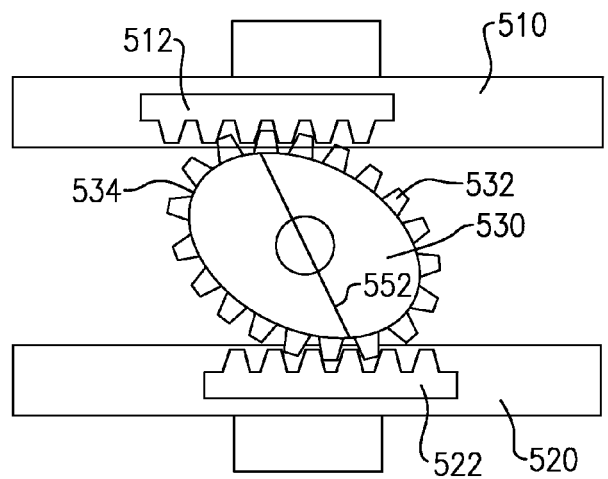
FIG. 6B schematically illustrates the third non-linear cam in an intermediate cam load position.
Figure 6C:
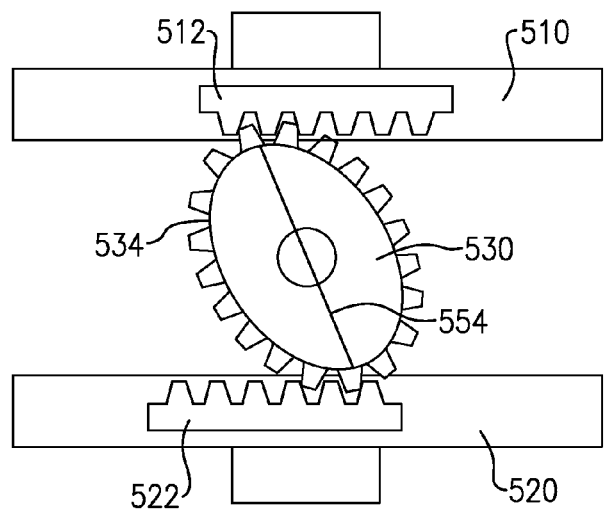
FIG. 6C schematically illustrates the third non-linear cam in a maximum cam load position.

FIGS. 6A-6C illustrate another example non-linear cam roller that can be used in the example toroidal traction drives 12 of FIGS. 1-3. The example cam roller 130, 230 of FIGS. 6A-6C uses cylindrical cam followers 530 having an ovoid cross section. The cylindrical cam follower 530 includes a plurality of gear teeth 532 on an outer circumference 534 of the cylindrical bearing 530. The cam roller walls 510, 520 likewise include a gearing portion 512, 522 that interfaces with the teeth 532 on the cylindrical bearing 530 to prevent the cylindrical bearing 530 from slipping as force is applied to it.

A diameter 550, 552, 554 of the cam follower 530 is not constant, resulting in an oval shaped cam follower 530, and gives rise to the non-linear behavior of the cam follower. In practice the cylindrical cam follower 530 of FIGS. 6A-6C and the ovoid shaped cam followers of FIGS. 4A-4C function similarly and provide the least axial loading force when the shortest diameter 550 of the cylindrical cam follower 530 is contacting the cam roller walls 510, 520, providing an intermediate axial loading when an intermediate diameter 552 is contacting the cam roller walls 510, 520, and providing a maximum loading when the largest diameter 554 is contacting the cam roller walls 510, 520.

Although example embodiments of this invention have been disclosed, a worker of ordinary skill in this art would recognize that certain modifications would come within the scope of this invention. A worker of skill in the art would also recognize that the above examples can be implemented alone or in any combination. For that reason, the following claims should be studied to determine the true scope and content of this invention.

The invention claimed is:
1. A toroidal traction drive comprising:
an axial loading system, wherein said axial loading system has a primary loading component and a non-linear cam roller loading component, and wherein a force required to rotate the non-linear cam roller loading component increases non-linearly as the non-linear cam roller loading component is rotated.

2. The toroidal traction drive of claim 1, wherein said primary loading component comprises at least one hydraulic piston operable to alter an axial roller gap in said non-linear cam roller.

3. The toroidal traction drive of claim 1, wherein said primary loading component comprises a sealed cam roller having a hydraulic fluid input connected to an axial roller gap, such that said axial roller gap is filled with hydraulic fluid.

4. The toroidal traction drive of claim 3, wherein a hydraulic pressure within said axial roller gap corresponds to an axial width of said axial roller gap such that increasing said hydraulic pressure increases said axial width of said axial roller gap, thereby increasing an axial loading force.

5. The toroidal traction drive of claim 1, wherein said non-linear cam roller comprises:
   a first roller disk;
   a second roller disk;
   an axial roller gap between said first roller disk and said second roller disk; and
   a plurality of cam followers disposed within said axial roller gap.

6. The toroidal traction drive of claim 5, wherein each of said plurality of cam followers is an ovoid shaped cam follower.

7. The toroidal traction drive of claim 5, wherein at least one of said first roller disk and said second roller disk comprises a non-linear gap wall.

8. The toroidal traction drive of claim 5, wherein each of said plurality of cam followers is a cylindrical cam follower having an ovoid cross section.

9. The toroidal traction drive of claim 1, wherein said primary loading component is a piezo-electric piston.

10. A toroidal traction drive comprising:
    an axial loading system, wherein said axial loading system has a primary loading component and a non-linear cam roller loading component;
    a first roller disk;
    a second roller disk;
    an axial roller gap between said first roller disk and said second roller disk;
    a plurality of cam followers disposed within said axial roller gap;
    wherein each of said plurality of cam followers is a cylindrical cam follower having an cross section; and
    wherein at least one of said first roller disk and said second roller disk comprises a gearing portion, wherein said cylindrical cam follower comprises a plurality of gear teeth arranged about a circumference of said ovoid cross section, and wherein said gearing portion and said gear teeth interface.

11. An integrated drive generator for an aircraft, comprising:
    a toroidal traction drive generator operable to receive rotational power from at least one source;
    a gear operable to output rotational power from said toroidal traction drive to an electrical generator; and
    wherein said toroidal traction drive comprises an axial loading system, wherein said axial loading system has a primary loading component and a non-linear cam roller loading component, and wherein a force required to rotate the non-linear cam roller loading component increases non-linearly as the non-linear cam roller loading component is rotated.

12. The integrated drive generator of claim 11, wherein said primary loading component comprises at least one hydraulic piston operable to alter an axial roller gap in said non-linear cam roller.

13. The integrated drive generator of claim 11, wherein said primary loading component comprises a sealed cam roller having a hydraulic fluid input connected to an axial roller gap, such that said axial roller gap is filled with hydraulic fluid.

14. The integrated drive generator of claim 13, wherein a hydraulic pressure within said roller gap corresponds to an axial width of said roller gap such that increasing said hydraulic pressure increases said axial width of said roller gap, thereby increasing an axial leading force.

15. The integrated drive generator of claim 11, wherein said non-linear cam roller comprises:
    a first roller disk;
    a second roller disk;
    and axial roller gap between said first roller disk and said second roller disk; and
    a plurality of cam followers disposed within said axial roller gap.

16. The integrated drive generator of claim 15, wherein each of said plurality of cam followers is an ovoid shaped cam follower.

17. The integrated drive generator of claim 15, wherein at least one of said first roller disk and said second roller disk comprises a non-linear gap wall.

18. The integrated drive generator of claim 15 wherein each of said plurality of cam followers is a cylindrical cam follower having an ovoid cross section.

19. The integrated drive generator of claim 11, wherein said primary loading component is a piezo-electric piston.

20. An integrated drive generator for an aircraft comprising:
    a toroidal traction drive generator operable to receive rotational power from at least one source;
    a gear operable to output rotational power from said toroidal traction drive to an electrical generator;
    wherein said toroidal traction drive comprises an axial loading system, wherein said axial loading system has a primary loading component and a non-linear cam roller loading component;
    a first roller disk;
    a second roller disk;
    and axial roller gap between said first roller disk and said second roller disk;
    a plurality of cam followers disposed within said axial roller gap;
    wherein each of said plurality of cam followers is a cylindrical cam follower having an ovoid cross section.

* * * * *